Figure 5:
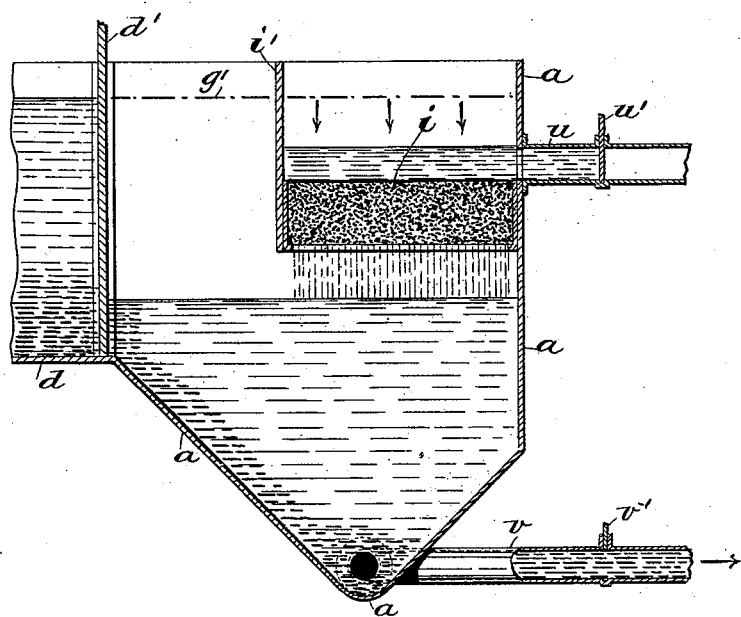

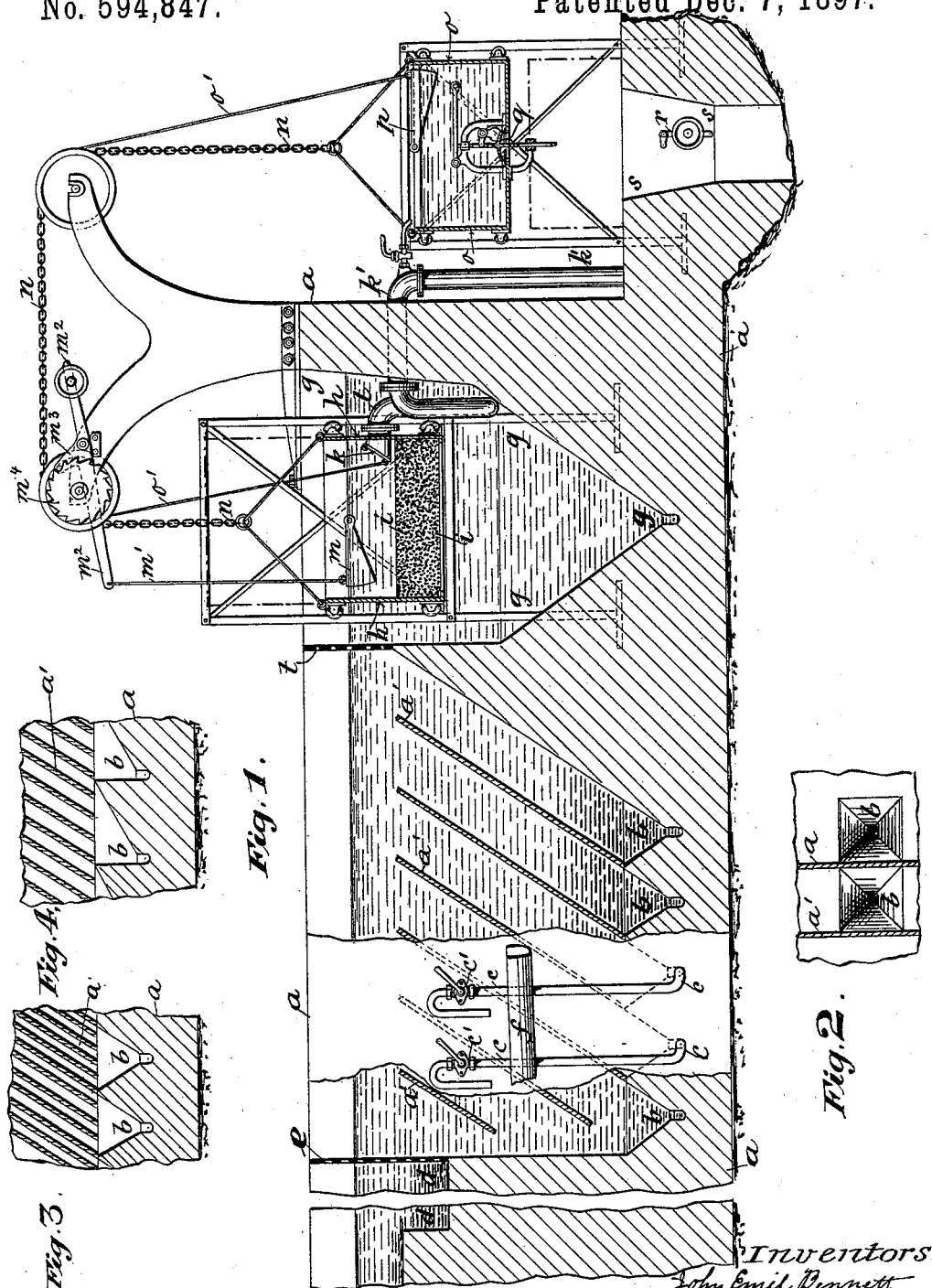

(No Model.) 2 Sheets—Sheet 2.
J. E. BENNETT & H. BERESFORD.
SEWAGE OR LIKE PRECIPITATING AND FILTERING TANK.

No. 594,847. Patented Dec. 7, 1897.

Witnesses:

Inventors:
John Emil Bennett
Henry Beresford
By Richardson
their Attorneys.

UNITED STATES PATENT OFFICE.

JOHN EMIL BENNETT AND HENRY BERESFORD, OF MANCHESTER, ENGLAND.

SEWAGE OR LIKE PRECIPITATING AND FILTERING TANK.

SPECIFICATION forming part of Letters Patent No. 594,847, dated December 7, 1897.

Application filed June 12, 1897. Serial No. 640,553. (No model.)

*To all whom it may concern:*

Be it known that we, JOHN EMIL BENNETT and HENRY BERESFORD, subjects of the Queen of Great Britain, residing at Manchester, in the county of Lancaster, in the Kingdom of Great Britain, have invented new and useful Improvements in Sewage or the Like Precipitating and Filtering Tanks, of which the following is a specification.

This invention relates to that type of precipitating and filtering tanks for sewage and the like wherein the sewage or fluid to be filtered is caused to ascend through the filtering medium, the object being to provide an improved method of and means for cleansing or freeing the filtering medium from the solid matter accumulating on or in the same and to remove the said solid matter from the tank continuously or periodically, as may be required.

To this end our improved method of cleansing the said type of filtering medium consists in so regulating the level of the inflowing sewage or fluid to be filtered relative to the upper surface of the filtering medium that a body of filtered water accumulates upon the latter and causes the said body of water to return and thus flush from the top to the bottom through the filtering medium periodically and thereby free it from accumulated solid matter. This method of cleansing the filtering medium may be carried out chiefly in two ways—viz., by arranging the filtering medium to be raised periodically or by having it stationary.

We attain these objects by the means illustrated in the accompanying two sheets of drawings, in which similar letters refer to similar parts throughout the several views.

Figure 1, Sheet I, is a longitudinal section of a precipitating-tank in which the filtering medium is adapted to be raised periodically; Fig. 2, a detached plan of the same, and Figs. 3 and 4 detached sections of two modifications.

Referring to Figs. 1 and 2, Sheet I, $a$ is the tank, furnished with inclined partitions $a'$ and having at the lower end thereof hoppers $b$, communicating with siphon-pipes $c$, having regulating-taps $c'$. The inlet end of the tank $a$ is formed with a receiver $d$, into which the sewage or fluid is run and in which it is mixed with the precipitant. Between the receiver $d$ and tank $a$ a stationary or revolving screen $e$, in the present instance a stationary one, is employed, which removes the large solid matter from the sewage previous to it entering the tank $a$. On entering the tank $a$ the heavy particles or precipitated matter falls onto the partitions $a'$ and is conveyed thereby into the hoppers $b$ below, where it enters the siphon-pipes $c$ and is caused to rise up the same by the head of sewage or fluid in the tank $a$, and from whence it is run off through a trough $f$, or otherwise suitably dealt with.

At the outlet end of the tank $a$ is formed a hopper-shaped compartment $g$, the lower end of which also communicates with a siphon-pipe, such as described in connection with the hopper, and into which compartment $g$ the partly-purified sewage or fluid flows and inside of which a filter is suspended, consisting of a casing $h$ and filtering medium $i$ at its bottom. The casing $h$ reaches above the level of the sewage or fluid in the tank $a$ and causes it to pass through the filtering medium $i$ from below. Above the latter an outlet-valve $k$ is arranged in the casing $h$, which by means of a flexible or jointed pipe $l$ is connected to the outlet-pipe $k'$ of the compartment $g$. To the inside of the filter-casing $h$ is hinged a float $m$, which, when in its lowest position, by suitable connections, in the present instance by means of a rod $m'$, connected thereto and to a weighted lever $m^2$, carrying a pawl $m^3$, engaging in a ratchet-wheel $m^4$, causes the filter to be locked in its working position. The casing $h$ is connected by means of a chain $n$, running over pulleys (or by means of a beam) to a balance vessel $o$, containing also a float $p$, into which vessel a portion of the effluent is run from the said outlet-pipe at a predetermined velocity. As the vessel $o$ fills, its float $p$ closes the outlet-valve $k$ through its connections $o'$ and the filter-casing $h$ fills, which causes the float $m$ therein to rise and release the filter by raising the lever $m^2$ and thereby moving the pawl $m^3$ out of gear with the ratchet-wheel $m^4$. By this time the balance vessel $o$ is full, and its weight causes the filter to rise and the filtered fluid in its casing to pass through the filtering medium $i$ in the reverse direction and the solid matter accumulated on its under side or in the same to be removed, thus thoroughly cleansing the filter automatically. The said solid matter descends to the bottom of the hopper below the filter, which it is caused to leave through the siphon-pipe connected therewith by the head of water in the tank, as previously described. When all the filtered fluid in the filter-casing $h$ has passed through the filtering medium $i$, the valve $q$ is raised off its seat by coming into contact with and being raised by the weighted lever $r$, employed in the pipe $s$, and the balance vessel $o$ discharges its contents into the latter, while when empty its weight is overcome by that of the empty filter, which then is permitted to descend and regain its working position, while the float $m$ therein also descends and locks the filter in its normal position, and the outlet-valve $k$ opens again through the fall of the float $p$ in the vessel $o$.

In some cases where scum is liable to accumulate on the surface of the sewage or fluid after having undergone precipitation between the same we may employ a screen $t$ in front of the filter, in the present instance a stationary one, to prevent the said scum reaching the filtering medium $i$.

In lieu of having only one inclined partition $a'$ for each hopper $b$ two or more may be employed, as shown in Figs. 3 and 4, and the section of the hopper $b$ may also be varied—for instance, as shown in Fig. 4.

We wish it to be understood that we do not confine ourselves to the means shown and described for periodically raising and lowering the filter for the purpose of causing the body of water above to flush back through the same, as the same ends may be attained by either way—for instance, by hydraulic means—as may be found most convenient without departing from the nature of our invention.

Figure 6:
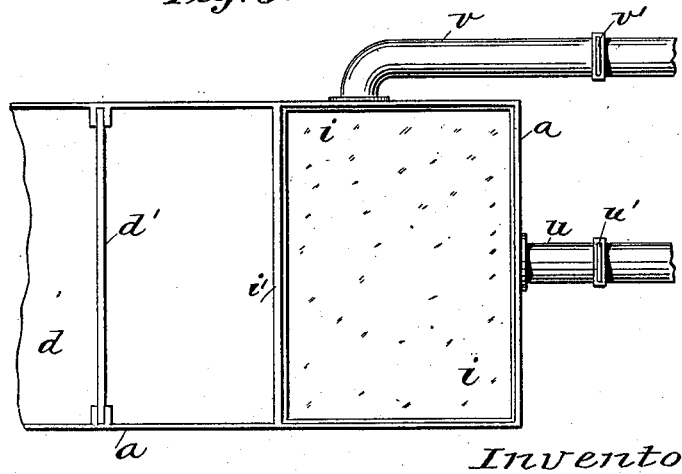

Figs. 5 and 6, Sheet II, are respectively a longitudinal section and a plan of a filter-tank with stationary filter.

$a$ is the precipitating or filtering tank, which is hopper-shaped; $i$, the filtering medium; $d$, the channel for the inlet of the sewage or fluid to be filtered; $u$, the pipe for the outlet of the filtered fluid, and $v$ the pipe for the outlet of the solid matter.

$d'$ is the inlet-valve.

$u'$ and $v'$ are outlet-valves, the relative positions of the said valves shown in the drawings being that when cleansing the filtering medium. The front of the filter is fitted with a partition $i'$, which reaches to the top of the tank $a$.

The sewage or fluid to be filtered is caused to ascend through the filtering medium $i$ to the level shown in dotted lines $g'$, so as to collect the solid matter on the lower surface of the filtering medium $i$, and thus allow the same to gravitate gradually to the bottom of the tank $a$.

When desired to thoroughly cleanse the filtering medium $i$, the supply of the sewage or fluid to be filtered and delivery of the filtered fluid are suitably cut off—say, as shown in the drawings, by means of the valves $d'$ and $u'$, respectively—and the filtered body of the fluid above the filtering medium $i$ is allowed to descend and flush through the same. This flushing action removes the solid matter which may be accumulated on the under side or in the filtering medium $i$ from the same, and falling to the bottom of the tank $a$ runs off through the pipe $v$, the valve $v'$ of which is open. When it is desired to recommence the filtering operation, the inlet and outlet valves $d'$ and $u'$ are opened and the outlet-valve $v'$ closed, as will be readily understood, which causes the water in the tank $a$ to rise to the level, as indicated by dotted lines $g'$, Fig. 5. The said valves may be operated by hand or mechanical means at predetermined intervals, as may be found most convenient.

The fluid to be filtered may be caused to ascend through the said filtering medium by giving it sufficient fall or by pressure and the vessel, tank, or cistern containing the same formed as may be found most convenient.

What we claim as our invention, and desire to secure by Letters Patent, is—

1. In sewage and the like precipitating and filtering tanks, having inclined partitions and hoppers at their lower ends, siphon-like pipes $c$, $c'$, through which the solid matter in the hopper $b$ can be removed at will through the medium of the head of fluid in the tank, all substantially as set forth.

2. In an apparatus for filtering sewage and the like, the combination with the compartment for the inflowing fluid to be filtered, the filter-casing suspended therein carrying a suitable filtering material and adapted to permit the fluid to pass upward through said filtering material, an outlet for the filtered fluid above the filtering material, and means for closing said outlet to permit a body of fluid to accumulate above the filtering material, and means for varying the comparative levels of the fluid in the outer compartment and that in the filter-casing whereby the fluid in the latter will pass through the filtering material in a reverse direction to cleanse the same, substantially as described.

3. In combination, the compartment for the fluid to be filtered, the filter-casing vertically movable therein, having a filtering-bed, the outlet above said bed, said filter being normally arranged to have the fluid in the compartment pass upward through the bed and out at said outlet, means for closing said outlet to permit a head of water to accumulate in the filter-casing, and means for raising the filter to discharge said head of water through the filter-bed to cleanse the same, substantially as described.

4. In combination, the compartment for the water to be filtered, the filter-casing vertically movable therein and having a filtering-bed, an outlet-pipe for said filtering-casing, a balancing-chamber connected with said filter-chamber, a fluid-supply pipe for gradually filling said balancing-chamber, means for closing the outlet-pipe from the filter-casing when the balancing-chamber is full to accumulate a body of fluid in the filter-casing, and means controlled by the rise of water within the filter-casing for releasing the counterbalancing-chamber and permitting the same to raise the filter-casing, substantially as described.

5. In combination, the compartment for the fluid to be filtered, the vertically-movable filter-casing, the counterbalancing-chamber connected therewith, the fluid-supply for gradually filling said counterbalancing-chamber, the outlet from the filter-casing, the valve for closing the same, the float in the counterbalancing-chamber connected with said valve for closing the same when the counterbalancing-chamber is full, the float in the filter-casing, means controlled by said float for releasing the counterbalancing-chamber when the filter-chamber is full, and means for automatically discharging the contents of the counterbalancing-chamber when the filter-casing has been raised to permit the parts to return to normal position, substantially as described.

In witness whereof we have hereunto set our hands in presence of two witnesses.

JOHN EMIL BENNETT.
HENRY BERESFORD.

Witnesses:
ALFRED BOSSHARDT,
STANLEY E. BRAMALL.